(12) United States Patent
Du Plessis et al.

(10) Patent No.: US 8,628,834 B2
(45) Date of Patent: Jan. 14, 2014

(54) FILLING FENESTRATION UNITS

(75) Inventors: Andries J. Du Plessis, Winchester, MA (US); Georg Rudolf Gertner, Frankfurt am Main (DE); James R. Satterwhite, North Andover, MA (US); Daniel P. Olsen, Medford, MA (US)

(73) Assignee: Cabot Corporation, Boston, MA (US)

( * ) Notice: Subject to any disclaimer, the term of this patent is extended or adjusted under 35 U.S.C. 154(b) by 818 days.

(21) Appl. No.: 12/123,064

(22) Filed: May 19, 2008

(65) Prior Publication Data

US 2008/0302059 A1 Dec. 11, 2008

Related U.S. Application Data

(60) Provisional application No. 60/938,935, filed on May 18, 2007, provisional application No. 60/951,054, filed on Jul. 20, 2007.

(51) Int. Cl.
*B32B 17/08* (2006.01)
*B32B 17/10* (2006.01)

(52) U.S. Cl.
USPC .............. 428/69; 428/76; 428/72; 52/745.15; 264/621

(58) Field of Classification Search
USPC ........ 52/745.15, 745.21, 171.3, 788.1, 783.1, 52/209; 29/897.32, 402.18; 264/9, 454, 264/621; 428/69
See application file for complete search history.

(56) References Cited

U.S. PATENT DOCUMENTS

| | | | |
|---|---|---|---|
| 2,196,874 A * | 4/1940 | Ruegg | 425/85 |
| 2,437,831 A | 3/1943 | Moore | |
| 2,595,262 A | 5/1952 | Hood | |
| 3,237,218 A * | 3/1966 | Moore | 114/357 |
| 4,446,850 A * | 5/1984 | Zilisch | 126/589 |
| 4,669,632 A * | 6/1987 | Kawasaki et al. | 428/172 |
| 4,811,538 A * | 3/1989 | Lehnert et al. | 52/455 |
| 4,931,333 A * | 6/1990 | Henry | 428/76 |
| 5,090,981 A * | 2/1992 | Rusek, Jr. | 65/443 |
| 5,261,875 A * | 11/1993 | Spears | 604/24 |
| 5,270,092 A * | 12/1993 | Griffith et al. | 428/69 |
| 5,271,980 A * | 12/1993 | Bell | 428/68 |
| 5,706,969 A * | 1/1998 | Yamada et al. | 220/592.2 |

(Continued)

FOREIGN PATENT DOCUMENTS

DE 35 33 805 A1 3/1987
DE 43 19 763 A1 12/1994

(Continued)

OTHER PUBLICATIONS

International Search Report dated Oct. 2, 2008, from International Application No. PCT/US2008/064092, filed on May 19, 2008.

(Continued)

*Primary Examiner* — Phi A (57) ABSTRACT

A method for fabricating an insulated system such as, for instance, an insulated window unit, includes introducing an insulating material between adjacent walls and stabilizing the system. Particulate insulators preferably are introduced in the system by filling an expanded internal volume. Stabilization of the system can be carried out by reducing the pressure within the internal volume. A stabilized insulated system is fabricated by introducing an insulating material between adjacent walls and stabilizing the system. Also disclosed are processes and equipment for filling insulated systems, such as fenestration units, and insulated systems comprising mixed insulating materials.

25 Claims, 10 Drawing Sheets

(56) References Cited

U.S. PATENT DOCUMENTS

| | | | |
|---|---|---|---|
| 5,728,743 A * | 3/1998 | Dyer et al. ................... 521/64 |
| 5,735,098 A * | 4/1998 | Kanai et al. ................... 52/508 |
| 5,786,059 A | 7/1998 | Frank et al. |
| 5,789,075 A | 8/1998 | Frank et al. |
| 5,988,388 A * | 11/1999 | Sutra et al. ................... 206/588 |
| 6,013,684 A * | 1/2000 | Suzuki et al. ................... 521/40 |
| 6,598,283 B2 | 7/2003 | Rouanet et al. |
| 6,645,598 B2 * | 11/2003 | Alderman ................... 428/69 |
| 6,709,600 B2 | 3/2004 | Hrubesh et al. |
| 6,811,852 B2 * | 11/2004 | Alderman ................... 428/69 |
| 6,887,563 B2 | 5/2005 | Frank et al. |
| 7,025,647 B2 * | 4/2006 | Miyazawa ................... 445/24 |
| 7,238,311 B2 * | 7/2007 | Ristic-Lehmann et al. .. 264/120 |
| 7,398,624 B2 * | 7/2008 | Swiszcz et al. ............ 52/506.08 |
| 7,520,223 B2 * | 4/2009 | Sharpe et al. ................. 102/303 |
| 7,611,429 B2 * | 11/2009 | O'Neill et al. ................. 473/604 |
| 7,641,954 B2 * | 1/2010 | Rouanet et al. ................. 428/76 |
| 7,774,997 B2 * | 8/2010 | Graf et al. ................... 52/171.3 |
| 7,797,950 B2 * | 9/2010 | Brower et al. ................. 62/55.5 |
| 7,858,841 B2 * | 12/2010 | Krautkramer et al. ........ 604/367 |
| 7,868,083 B2 * | 1/2011 | Ristic-Lehmann et al. .. 524/544 |
| 2001/0034375 A1 | 10/2001 | Schwertfeger et al. |
| 2003/0146346 A1 * | 8/2003 | Chapman Jr. ................. 244/123 |
| 2005/0046086 A1 | 3/2005 | Lee et al. |
| 2005/0072488 A1 | 4/2005 | Rouanet et al. |
| 2005/0074566 A1 | 4/2005 | Rouanet et al. |
| 2005/0167891 A1 | 8/2005 | Lee et al. |
| 2006/0187608 A1 * | 8/2006 | Stark ........................... 361/202 |
| 2006/0272727 A1 | 12/2006 | Dinon et al. |
| 2007/0113486 A1 * | 5/2007 | Howland ............................ 52/1 |
| 2008/0014435 A1 * | 1/2008 | Smith et al. ................... 428/331 |
| 2008/0174147 A1 * | 7/2008 | Skaradzinski ............. 296/181.3 |

FOREIGN PATENT DOCUMENTS

| | | | |
|---|---|---|---|
| DE | 195 07 732 A1 | | 9/1996 |
| EP | 0 468 124 A1 | | 1/1992 |
| EP | 0 645 576 A1 | | 3/1995 |
| GB | 2186838 A | * | 8/1987 |
| JP | 56089683 A | * | 7/1981 |
| JP | 56151537 A | * | 11/1981 |
| JP | 62083466 A | * | 4/1987 |
| JP | 62116145 A | * | 5/1987 |
| JP | 02261185 A | * | 10/1990 |
| JP | 03039586 A | * | 2/1991 |
| JP | 04014804 A | * | 1/1992 |
| JP | 04108974 A | * | 4/1992 |
| WO | 2005/032943 A2 | | 4/2005 |
| WO | 2005/033432 A1 | | 4/2005 |
| WO | 2007/047970 A2 | | 4/2007 |

OTHER PUBLICATIONS

International Search Report and Written Opinion dated Dec. 12, 2008 from counterpart International Application No. PCT/US2008/064092, filed on May 19, 2005.

International Preliminary Report on Patentability, dated Nov. 24, 2009, from corresponding International Application No. PCT/US2008/064092, filed on May 19, 2008.

Dengler, J. J., et al., "Final Report Glazings with Granular Aerogel, contract JOUE-CT90-0057," Fraunhofer-Institut fur Solare Energiesysteme (ISE), Freiburg, Germany, Dec. 15, 1993.

Gütegemeinschaft Mehrscheiben-Isolierglas e.V., Rundschreiben Güte-Und Prüfbestimmungen, Troisdorf, Germany, Nov. 2002.

* cited by examiner

FILLING FENESTRATION UNITS

RELATED APPLICATIONS

This application claims the benefit of U.S. Provisional Patent Application No. 60/938,935, with the title Filling and Stabilization of Aerogel Insulated Systems, filed May 18, 2007 and of U.S. Provisional Patent Application No. 60/951, 054 filed Jul. 20, 2007, with the title Filling Fenestration Units, the contents of both being incorporated herein by reference in their entirety.

BACKGROUND OF THE INVENTION

Insulated windows and spandrel panels are increasingly used in residential and commercial buildings. Double pane, as well as triple pane, and even quadruple pane window units are available. In many existing insulated windows the internal space is filled with air. Sometimes the internal space is filled with a gas such as argon or krypton for better thermal resistance value. Insulated glass units and daylighting systems that employ particulate aerogel material also are becoming available.

Filling the internal cavity of such units with aerogel particles, however, continues to present challenges. Inadequate techniques can lead to "settling", resulting in diminished insulating properties and uneven translucence.

A need exists, therefore, for insulated systems and methods of fabricating such systems that reduce or minimize these problems.

SUMMARY OF THE INVENTION

The invention generally relates to insulated systems, for instance fenestration units that include an insulator between adjacent walls. The walls can be made of glass, polymer, stone, ceramic, metal and so forth. The insulator can be in particulate or monolithic form or can be or can include a composite. In preferred embodiments, the insulator includes an aerogel material. The aerogel material can be used alone or in combination with other materials.

In one aspect of the invention a method for producing an insulated system comprises introducing an insulator in an internal volume between adjacent walls to form a layered structure and stabilizing the layered structure to produce the insulated system. In one example, the method further includes expanding the internal volume, for instance by applying a force pulling the walls apart or by maintaining the internal volume at a pressure that is higher than the pressure on the outer faces of adjacent walls.

Stabilization preferably is conducted by removing at least a portion of gas from the internal volume. For instance, a reduced pressure can be applied to the internal volume. In other examples, the layered structure is stabilized by elastic springback of the adjacent walls.

In another aspect of the invention an insulated system is fabricated by a method comprising introducing an insulator in an internal volume between adjacent walls to form a layered structure and stabilizing the layered structure to produce the insulated system.

In a further aspect of the invention, a stabilized insulated system comprises a first wall, a second wall and an insulator between the first and second wall. In yet another aspect, the invention is directed to an internally unreinforced insulated system comprising an aerogel material or a blend including an aerogel material between polycarbonate adjacent walls. The system can have a surface area greater than about 0.1 square meters ($m^2$).

The invention also relates to processes and equipment for filling insulated systems, e.g., fully framed fenestration units, in which particulate material is fed through a vented tube into an opening, preferably located in the frame. In one example, the frame is provided with one or more orifices for equalizing or reducing the pressure within the cavity by venting or by drawing a vacuum by means of a vacuum pump or another suitable device.

In yet another aspect of the invention, a filling apparatus includes a vented tube connecting a container housing particulate material to a cavity within an insulated system.

The invention addresses the increased demand for energy conservation and "green" construction practices and materials and has many advantages. For example, window units manufactured using the method of the invention have excellent insulating and optical properties. Practicing the invention allows for the filling of cavities with aerogel and reduces or minimizes settling and can add to the overall mechanical stability of the system. In glass units, the invention can result in a finished product having essentially parallel panes and little optical distortion. The invention also can reduce or minimize the need for internal reinforcements in polycarbonate systems and is particularly well suited for fabricating relatively large, un-reinforced daylighting systems. In some aspects, practicing the invention reduces or minimizes crack formation and breakage. Filling fenestration units with blends of aerogel and non-aerogel materials presents cost advantages and added flexibility within a product line. In spandrel applications, fenestration units such as described herein and filled with an insulator containing aerogel and, optionally a non-aerogel material, can be glazed into the profiled system as a finished unit, eliminating the back pans, other insulating materials and labor required to fabricate and install them.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The above and other features of the invention including various details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

The invention generally relates to insulated systems such as fenestration units and methods for producing them. The insulated systems can be used in buildings and other types of construction, transportation, storage containers, refrigeration, green houses, manufacturing or processing units and so forth.

Many embodiments of the invention relate to an insulating system which includes two or more walls and an insulator, also referred to herein as an insulating material. Preferably, the insulator is disposed between at least two adjacent walls.

The walls can be transparent, translucent or opaque and can be made of the same or different materials. Suitable materials include glass, metals, stone, ceramics, plastics, e.g., polycarbonate, polyesters, acrylics, fiber-reinforced panels, laminated structures, and others.

Preferably the walls are flat and parallel or essentially parallel to one another. In a specific example, the walls are sheets or panes such as used in double or triple pane window units and are held in a frame, as known in the art.

The walls are sized to the particular application. In a specific example, the walls are sized for relatively large systems and can have a surface of at least 4 $m^2$. The invention also can be practiced with walls having smaller surface, e.g., less than about 0.25 $m^2$.

For glass walls, wall thickness preferably is within the range of from about 2 mm to about 10 mm. In polycarbonate systems, wall thickness preferably is within the range of from about 1 mm to about 10 mm. Polyester walls preferably have a thickness within the range of from about 1 mm to about 6 mm. Metal wall thickness can be within the range of from about 0.5 mm to about 6 mm. Within one system, the wall thickness can be the same for two or more walls, or can be different.

In one example, at least one wall face is coated, for instance with an ultraviolet (UV) reflecting film, a dyed layer, a scratch-resistant material, or with other suitable coatings. Uncoated walls also can be utilized.

Adjacent walls define an internal space also referred to herein as a "cavity" or "gap". The "gap width", W, is the distance between adjacent walls. Systems that have a constant or essentially constant gap width throughout are preferred.

The gap width can be dimensioned for a particular application. For example, the gap width can be within the range of from about 3 mm to about 200 mm. If more than two walls are employed, gaps between any two adjacent walls can have the same or a different gap width.

The gap can include one or more internal reinforcements such as one or more spacers, e.g., rubber spacers, internal supports, inner walls, e.g., walls dividing the gap into channels, ribs, springs or other bracing devices. Positioned in the gap between adjacent walls, internal reinforcements can stabilize the overall system during manufacturing, distribution, installation and service life. In glass systems internal reinforcements can reduce the likelihood of breakage and they can mitigate flimsiness in systems constructed with thin plastic, e.g., polycarbonate, walls.

Examples of insulated panel and glazing systems that have a channeled gap and inner walls are described in International Application No. WO 2005/033432 A1, published on Apr. 14, 2005, the teachings of which are incorporated herein by reference in their entirety.

In a preferred aspect of the invention, the insulated system is "internally un-reinforced", i.e., the system does not include an internal reinforcement such as described above.

Figure 1:
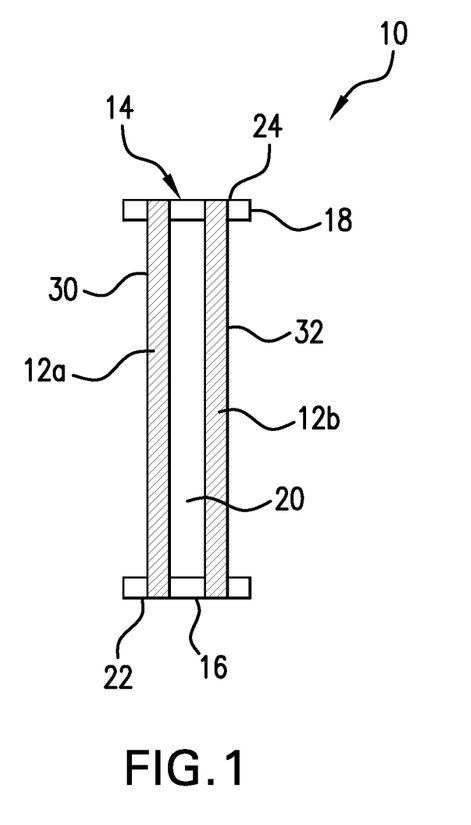
FIG. 1 is a cross sectional view of a system including an insulating material sandwiched between two walls.

FIG. 1 is a cross sectional view of an insulated system. Shown in FIG. 1 is system 10 which includes walls, e.g., panes, 12a and 12b. Walls 12a and 12b can be secured by frame 14 having frame member 16 and top frame member 18. Gap 20, defined by walls 12a and 12b has gap width W and internal volume V. Optionally, system 10 can include one or more reinforcements, not shown in FIG. 1.

The insulated system, e.g., insulating system 10, includes an insulating material within the gap between two adjacent walls, e.g., gap 20. As used herein, the term "insulating" or "insulator" refers to one or more of thermal, acoustic or electric insulating properties.

In one aspect of the invention, the insulator present in the gap is a thermal insulator. Preferably, its "R-value", which is a measure of thermal resistance to heat flow, is at least 2, more preferably between 3 and 38.

In one example the insulator has a substantially constant thermal conductivity (k) value within the range of from about 12 to about 30 (mW)/m·K at a mean temperature of 37° C and 1 atmosphere of pressure. Also preferred are insulators for which the k value decreases with load or compression as well as reduced pressure.

In another aspect of the invention, the insulator is an acoustic insulator. For instance, it can slow down the speed of sound through the material, reducing noise, in particular in the lower nuisance range.

In yet another aspect of the invention the insulator is an electrical insulator.

In specific embodiments, the insulating material employed between at least two adjacent walls is a porous, e.g., a microporous or a nanoporous material. As used herein, the term "microporous" refers to materials having pores that are about 1 micron and larger. As used herein, the term "nanoporous" refers to a material having pores that are smaller than about 1 micron, preferably less than 0.1 microns. In specific examples, the nanoporous material is an oxide of a metal, for instance, silicon, aluminum, zirconium, titanium, hafnium, vanadium, yttrium and others, and/or mixtures thereof. Metal oxide materials such as aerogels or xerogels are preferred.

Aerogels are low density porous solids that have a large intraparticle pore volume. Generally, they are produced by removing pore liquid from a wet gel. However, the drying process can be complicated by capillary forces in the gel pores, which can give rise to gel shrinkage or densification. In one manufacturing approach, collapse of the three dimensional structure is essentially eliminated by using supercritical drying. A wet gel also can be dried using an ambient pressure, also referred to as non-supercritical drying process. When applied, for instance, to a silica-based wet gel, surface modification, e.g., end-capping, carried out prior to drying, prevents permanent shrinkage in the dried product. The gel can still shrinks during drying but springs back recovering its former porosity.

Product referred to as "xerogel" also is obtained from wet gels from which the liquid has been removed. The term often designates a dry gel compressed by capillary forces during drying, characterized by permanent changes and collapse of the solid phase network.

For convenience, the term "aerogel" is used herein in a general sense, referring to both "aerogels" and "xerogels".

Aerogels typically have low bulk densities (about 0.15 g/cm$^3$ or less, preferably about 0.03 to 0.3 g/cm$^3$), very high surface areas (generally from about 300 to about 1,000 square meter per gram (m$^2$/g) and higher, preferably from about 600 to about 1000 m$^2$/g), high porosity (about 90% and greater, preferably greater than about 95%), and a relatively large pore volume (about 3 milliliter per gram (mL/g), preferably about 3.5 mL/g and higher). Aerogels can have a nanoporous structure with pores smaller than 1 micron (μm). Often, aerogels have a mean pore diameter of about 20 nanometers (nm). The combination of these properties in an amorphous structure gives low thermal conductivity values (e.g., 9 to 16 (mW)/m·K at a mean temperature of 37° C. and 1 atmosphere of pressure). Aerogels can be nearly transparent or translucent, scattering blue light, or can be opaque. In preferred embodiments of the invention, the aerogel employed has good light transmission properties.

A common type of aerogel is silica-based. Aerogels based on oxides of metals other than silicon, e.g., aluminum, zirconium, titanium, hafnium, vanadium, yttrium and others, or mixtures thereof can be utilized as well.

Also known are organic aerogels, e.g., resorcinol or melamine combined with formaldehyde, dendredic polymers, and so forth, and the invention also could be practiced using these materials.

Suitable aerogel materials and processes for their preparation are described, for example, in U.S. Patent Application No. 2001/0034375 A1 to Schwertfeger et al., published on Oct. 25, 2001, the teachings of which are incorporated herein by reference in their entirety.

The aerogel material employed can be hydrophobic. As used herein, the terms "hydrophobic" and "hydrophobized" refer to partially as well as to completely hydrophobized aerogel. The hydrophobicity of a partially hydrophobized aerogel can be further increased. In completely hydrophobized aerogels, a maximum degree of coverage is reached and essentially all chemically attainable groups are modified.

Hydrophobicity can be determined by methods known in the art, such as, for example, contact angle measurements or by methanol (MeOH) wettability. A discussion of hydrophobicity in relation to aerogels is found in U.S. Pat. No. 6,709,600 B2 issued to Hrubesh et al. on Mar. 23, 2004, the teachings of which are incorporated herein by reference in their entirety.

Hydrophobic aerogels can be produced by using hydrophobizing agents, e.g., silylating agents, halogen- and in particular fluorine-containing compounds such as fluorine-containing alkoxysilanes or alkoxysiloxanes, e.g., trifluoropropyltrimethoxysilane (TFPTMOS), and other hydrophobizing compounds known in the art. Hydrophobizing agents can be used during the formation of aerogels and/or in subsequent processing steps, e.g., surface treatment.

Silylating compounds such as, for instance, silanes, halosilanes, haloalkylsilanes, alkoxysilanes, alkoxyalkylsilanes, alkoxyhalosilanes, disiloxanes, disilazanes and others are preferred. Examples of suitable silylating agents include, but are not limited to diethyldichlorosilane, allylmethyldichlorosilane, ethylphenyldichlorosilane, phenylethyldiethoxysilane, trimethylalkoxysilanes, e.g., trimethylbutoxysilane, 3,3,3-trifluoropropylmethyldichlorosilane, symdiphenyltetramethyldisiloxane, trivinyltrimethylcyclotrisiloxane, hexaethyldisiloxane, pentylmethyldichlorosilane, divinyldipropoxysilane, vinyldimethylchlorosilane, vinylmethyldichlorosilane, vinyldimethylmethoxysilane, trimethylchlorosilane, hexamethyldisiloxane, hexenylmethyldichlorosilane, hexenyldimethylchlorosilane, dimethylchlorosilane, dimethyldichorosilane, mercaptopropylmethyldimethoxysilane, bis{3-(triethoxysilyl)propyl}tetrasulfide, hexamethyldisilazane and combinations thereof.

The aerogel can include one or more additives such as fibers, opacifiers, color pigments, dyes and mixtures thereof. For instance, a silica aerogel can be prepared to contain additives such fibers and/or one or more metals or compounds thereof. Specific examples include aluminum, tin, titanium, zirconium or other non-siliceous metals, and oxides thereof. Non-limiting examples of opacifiers include carbon black, titanium dioxide, zirconium silicate, and mixtures thereof. Additives can be provided in any suitable amounts, e.g., depending on desired properties and/or specific application.

Aerogel can be produced in monolithic shape, for instance as a rigid, semi-rigid, semi-flexible or flexible structure, e.g., mat shaped composites that include fibers.

In one specific example, the insulator is or includes a cracked aerogel monolith such as described in U.S. Pat. No. 5,789,075, issued on Aug. 4, 1998 to Frank et al., the teachings of which are incorporated herein by reference in their entirety. Preferably, the cracks enclose aerogel fragments that are connected by fibers. Aerogel fragments can have an average volume of 0.001 mm$^3$ to 1 cm$^3$. In one composite, the aerogel fragments have an average volume of 0.1 mm$^3$ to 30 mm$^3$.

In other specific examples, the insulator is in the form of an aerogel sheet or blanket. The sheet or blanket can include, for instance, aerogel particles dispersed in fibers. In other cases, the sheet or blanket includes fibrous batting with continuous aerogel throughout. Sheets or blankets can be produced, for instance, from wet gel structures as described in U.S. Patent application Publication Nos. 2005/0046086 A1, published on Mar. 3, 2005 and 2005/0167891 A1, published on Aug. 4, 2005, both to Lee et al., the teachings of which are incorporated herein by reference in their entirety.

Composite materials such as those that include fibers and aerogel (e.g., fiber-reinforced aerogels) and, optionally, at least one binder also can be employed. The fibers can have any suitable structure. For example, the fibers can have no structure (e.g., unassociated fibers). The fibers can have a matrix structure or similar mat-like structure which can be patterned or irregular and random. Preferred composites of materials comprising fibers include composites formed from aerogels and fibers wherein the fibers have the form of a lofty fibrous structure, batting or a form resembling a steel wool pad. Examples of materials suitable for use in the preparation of the lofty fibrous structure include fiberglass, organic polymeric fibers, silica fibers, quartz fibers, organic resin-based fibers, carbon fibers, and the like. The material having a lofty fibrous structure can be used by itself or in combination with a second, open-cell material, e.g., an aerogel material. For instance, a blanket can have a silica aerogel dispersed within a material having a lofty fibrous structure.

Other composite materials suitable in forming the insulator include at least one aerogel and at least one syntactic foam. The aerogel can be coated to prevent intrusion of the polymer into the pores of the aerogel, as described, for instance in International Publication No. WO 2007047970, with the title Aerogel Based Composites, the teachings of which are incorporated herein by reference in their entirety.

In a further specific example, the insulator is a composite that includes aerogel material, a binder and at least one fiber material as described, for instance, in U.S. Pat. No. 6,887,563, issued on May 3, 2005 to Frank et al., the teachings of which are incorporated herein by reference in their entirety.

Other specific examples of aerogel-based insulators are fiber-web/aerogel composites that include bicomponent fibers as disclosed in U.S. Pat. No. 5,786,059 issued on Jul. 28, 1998 to Frank et al., the teachings of which are incorporated herein by reference in their entirety. Such composites use at least one layer of fiber web and aerogel particles, wherein the fiber web comprises at least one bicomponent fiber material, the bicomponent fiber material having lower and higher melting regions and the fibers of the web being bonded not only to the aerogel particles but also to each other by the lower melting regions of the fiber material. In some applications, the bicomponent fibers are manufactured fibers which are composed of two firmly interconnected polymers of different chemical and/or physical constructions and which have regions having different melting points, i.e. lower and higher melting regions.

As described in the above-referenced patent, the bicomponent fibers can have a core-sheath structure. The core of the fiber is a polymer, preferably a thermoplastic polymer, whose melting point is higher than that of the thermoplastic polymer which forms the sheath. The bicomponent fibers are preferably polyester/copolyester bicomponent fibers. It is also possible to use bicomponent fiber variations composed of polyester/polyolefin, e.g. polyester/polyethylene, or polyester/copolyolefin or bicomponent fibers having an elastic sheath polymer. Side-by-side bicomponent fibers also can be employed.

The fiber web may further comprise at least one simple fiber material which becomes bonded to the lower melting regions of the bicomponent fibers in the course of thermal consolidation. The simple fibers are organic polymer fibers, for example polyester, polyolefin and/or polyamide fibers, preferably polyester fibers. The fibers can be round, trilobal, pentalobal, octalobal, ribbony, like a Christmas tree, dumb-bell-shaped or otherwise star-shaped in cross section. It is similarly possible to use hollow fibers. The melting point of these simple fibers should be above that of the lower melting regions of the bicomponent fibers.

The insulating material employed also can be in particulate form, for instance, in the form of powders, granules, pellets, beads and so forth. The particles have a particle size suitable to the application. For instance, the particles can be within the range of from about 0.01 microns (µm) to about 10.0 mm, preferably with a mean particle size in the range of 0.3 to 4.0 mm.

Examples of commercially available aerogel materials in particulate form are those supplied under the tradename of Nanogel® by Cabot Corporation, Billerica, Mass. Nanogel® granules have high surface, are about 95% porous and are available in a particle size ranging, for instance, from than about 8 microns (µm) to about 10 mm. Void volume of a packed bed of such particles includes both inter- and intra-particle voids.

The insulator also can consist of, consist essentially of or can include a porous material other than an aerogel. In specific examples, the material is a microporous or, preferably, a nanoporous oxide of a metal such as silicon, aluminum, zirconium, titanium, hafnium, vanadium, yttrium and others, and/or mixtures thereof. As used herein, the term "microporous" refers to materials having pores that are about 1 micron and larger; the term "nanoporous" refers to materials having pores that are smaller than about 1 micron, preferably less than about 0.1 microns. Pore size can be determined by methods known in the art, such as mercury intrusion porosimetry, or microscopy. Preferably the pores are interconnected giving rise to open type porosity.

Combinations of insulating materials such as described above also can be employed. For instance, the insulator can include different types of aerogel, e.g., in particulate and/or monolithic form.

Aerogels also can be combined with a non-aerogel material, for example with one or more conventional insulators such as gas, e.g., argon, air, carbon dioxide, vacuum; perlite; fiber glass; silica; aluminoasilicates; plastics; or others known in the construction industry.

If translucency is important, aerogel material can be combined with transparent or translucent non-aerogel material, for instance, glass microbeads or microspheres, such as those commercially available from 3M Corporation.

If in particulate form, the non-aerogel material can have a particle size suitable for the application. Parameters that can be considered include dust formation, unit dimensions, in particular filling openings, packing efficiency, commercial availability and so forth. For instance, a suitable particle size of the non-aerogel material can be within the range of from about 0.05 mm and about 4 mm.

Aerogel and non-aerogel materials can be blended in any proportion suitable to the application. Cost requirements, insulating properties, light transmission, function of the composite within the overall construction are some of the factors that can be considered. Generally, the non-aerogel material can be present in the mixture in an amount anywhere from 0% to 99%. For instance, aerogel and non-aerogel materials can be blended in 20:80 to 80:20 ratios, e.g., 60:40, 50:50 or 40:60. Other ratios can be used.

Optionally, the material employed to form the insulator, e.g., loose aerogel particles or another granular material, can be enclosed in a film or casing made of one or more polymers such as nylon, polycarbonate, metal sheets, or other suitable materials, forming a pillow, mat, bag, and the like. The material also can be present in layers.

Hydrophobic insulators are preferred. Also preferred are water and mold resistant materials. Insulators may also have fire resistant or fire-proof properties.

In one aspect of the invention, the insulating material has a density less than about 0.5 g/cm$^3$, preferably less than about 0.3 g/cm$^3$ and more preferably less than about 0.1 g/cm$^3$. In another aspect of the invention, the insulating material has a void volume fraction of at least 10% and preferably at least 50%. In specific examples, the insulating material has a void volume % of at least 90%.

In some embodiments, the insulating material has a light transmission greater than 0% and preferably is translucent. As used herein, the term "translucent" refers to a light transmittance (% T) of at least 0.5% when measured at visible light wavelengths. Preferably, the insulating material has a % T of at least, 10% for a 0.25 inch thickness. As one example, an insulator made of Nanogel® material and having a thickness of 25 mm has a visible light transmission of about 53%, while an insulator made of Nanogel®, having a thickness of 50 mm, has a visible light transmission of about 26%. In further aspects of the invention, the insulating material eliminates glare, allowing a soft, deep distribution of daylight. Light transmission through a Nanogel® insulator, for example, can be diffused.

In a specific aspect of the invention, the insulating system is an insulated window unit which includes a translucent aerogel material sandwiched between two adjacent glass panes.

Non-translucent insulators, e.g., consisting of, consisting essentially of, or including opaque aerogels, also can be employed. Spandrel areas, for instance, relate to opaque areas, as contrasted to the vision area of a curtain wall, which is formed by the use of spandrel panels which are either intrinsically opaque or are rendered opaque by various backing or coating materials. Spandrel units, also referred to as "spandrel panels" or "spandrels" can be employed to thermally isolate and/or conceal certain portions of the interior structure of a building. Often, spandrels are employed to conceal floor slabs, mechanical chase ways, vertical spans between floors and ceilings or between successive viewing closures, heating and air conditioning convectors and so forth. Spandrel units also can be used in building zones where it is desired to maintain a degree of privacy, such as at the ground level of a building.

To fabricate an insulated system, insulating, e.g., aerogel, material is introduced between two adjacent walls to form a layered structure. The layered structure is then stabilized to produce the insulating system.

Aerogels or other insulating materials can be incorporated within the system by techniques such as disclosed, for instance in U.S. Pat. No. 6,598,283 B2, issued to Rouanet et al. on Jul. 29, 2003, the teachings of which are incorporated herein by reference in their entirety. For example, U.S. Pat. No. 6,598,283 B2 describes a method which includes providing a sealed first container comprising aerogel particles under a first air pressure that is less than atmospheric pressure. The unrestrained volume of the aerogel particles at the first air pressure is less than the unrestrained volume of the aerogel particles under a second air pressure that is greater than the first air pressure. The sealed first container then is placed within a second container, and the sealed first container is breached to equalize the air pressure between the first and second containers at the second air pressure and to increase the volume of the aerogel particles, thereby forming the insulation article.

Technology described in U.S. Patent Application Publication No. 2006/0272727 A1, to Dinon et al., published on Dec. 7, 2006 also can be adapted to incorporate insulating material into the systems disclosed herein. U.S. Patent Application Publication No. 2006/0272727 discloses an insulated pipe-in-pipe assembly comprising (a) at least one inner pipe, (b) an outer pipe disposed around the at least one inner pipe so as to create an annular space between the outer and inner pipes, (c) porous, resilient, compressible material disposed in the annular space, and (d) a remnant of a container that previously was positioned in the annular space and previously held the compressible material in a volume less than the volume of the compressible material in the annular space. A method for making such an insulated pipe-in-pipe assembly also is described.

Systems which employ monolithic aerogel material, e.g., an aerogel sheet or blanket, or aerogel composites can be formed by layering the insulating material on one pane, for instance wall 12a, set on one of its faces, followed by laying the other pane, for instance wall 12b, on top of the monolith.

In other examples, the walls, e.g., walls 12a and 12b, can be secured in a partial frame, e.g., a three sided frame, and the monolith can be inserted into the gap through the unframed side. In system 10, for instance, the monolith can be inserted by removing top frame member 18.

Particulate aerogel material can be introduced between walls 12a and 12b using an opening in frame 14. For example, walls 12a and 12b can be secured in a complete frame, e.g., a four-sided frame, having an opening, preferably sealable, for filling the inner volume with aerogel particles. The opening can have a suitable shape, e.g., round, oval, slit-like, and so forth.

The opening can be positioned at any suitable location along frame 14. Corner as well as edge placements can be selected. More than one opening can be employed.

In further examples, walls 12a and 12b are held in a partial, e.g., three-sided, frame and aerogel particles are filled through the missing frame side, e.g., by removing top member 18. The system can be finished by completing the frame, e.g., adding top member 18.

For gravity induced filling, system 10 is held in a vertical position or at an angle less than 90° with respect to the vertical direction. During filling, system 10 can be supported by bottom frame member 16. In other arrangements, system 10 is supported at one corner, e.g., corner 22 in FIG. 1 and the orifice preferably is located at corner 24. During the filling process, the panel can be flipped around one or more times.

Filling and/or packing can be enhanced by using vibration, tamping or both. Techniques and equipment that can be employed are described in U.S. Patent Application Nos. 20050074566 A1 and 20050072488 A1, both to Rouanet and published on Apr. 7, 2005 and International Publication Nos. WO 2005/032943 A2, and WO 2005/033432 A1, both published on Apr. 14, 2005. The teachings of these U.S. and PCT publications are incorporated herein by reference in their entirety.

Aerogel particles can be added to the internal volume from a hopper while the construct is being vibrated. The vibration process can be carried out using a drum vibrator. The vibration frequency of the drum can be maintained, for example, at 60 Hz until the internal volume is visibly full. Alternatively the frequency can be varied, e.g., from 0 to 60 Hz, one or more times to increase the packing density of the particulate material. The frequency also can be varied from 0 to 120 Hz or higher.

Filling can be conducted in air or using a gas such as nitrogen or other inert gas. Filing also can be conducted at reduced pressure, for instance by removing air from the internal volume prior to and/or during filling.

Filling rates can depend on factors such as size opening size, gap volume, material employed, production parameters and other criteria.

Figure 7:
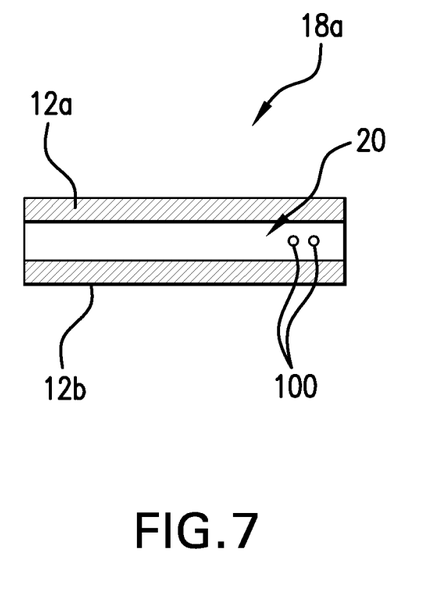
FIG. 7 is a view of the top section of a fully framed system having orifices for equalizing or reducing the pressure within the internal cavity.

To increase the flow rate of a particulate material through an opening in a fully framed system, internal gases can be vented through one or more orifices. Shown in FIG. 7, for instance, are two orifices 100 located in top frame spacer 18a. Locations elsewhere in frame 14 or in one or both walls 12a and/or 12b also can be employed. Vent holes prevent reverse airflow through the filling opening by providing an alternative vent path.

Figure 8:
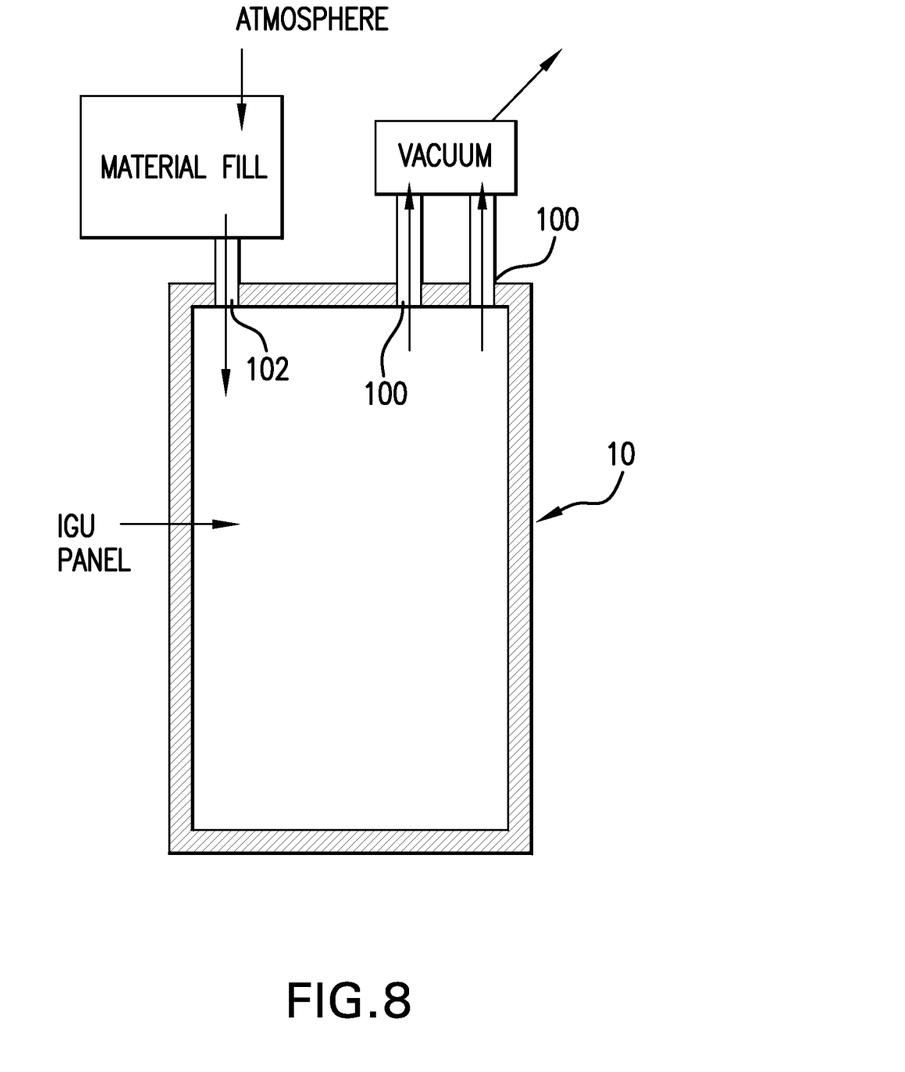
FIG. 8 is a schematic diagram depicting filling the cavity of a system while reducing the pressure in the cavity.

In further examples, the pressure within the system is reduced by connecting the orifices to a vacuum pump or another suitable device, thereby forcefully removing gases from within the cavity and creating a positive gas flow into the system through the filling orifice, thereby increasing the filling rate of particulate material into the system. A schematic diagram of the filling process while reducing the pressure inside a system such as an insulating glass unit (IGU) is shown in FIG. 8. Shown in FIG. 8 is system 10, e.g., a fully framed insulated glass unit, having opening 102 for introducing particulate material and orifices 100 for drawing a vacuum.

Figure 9:
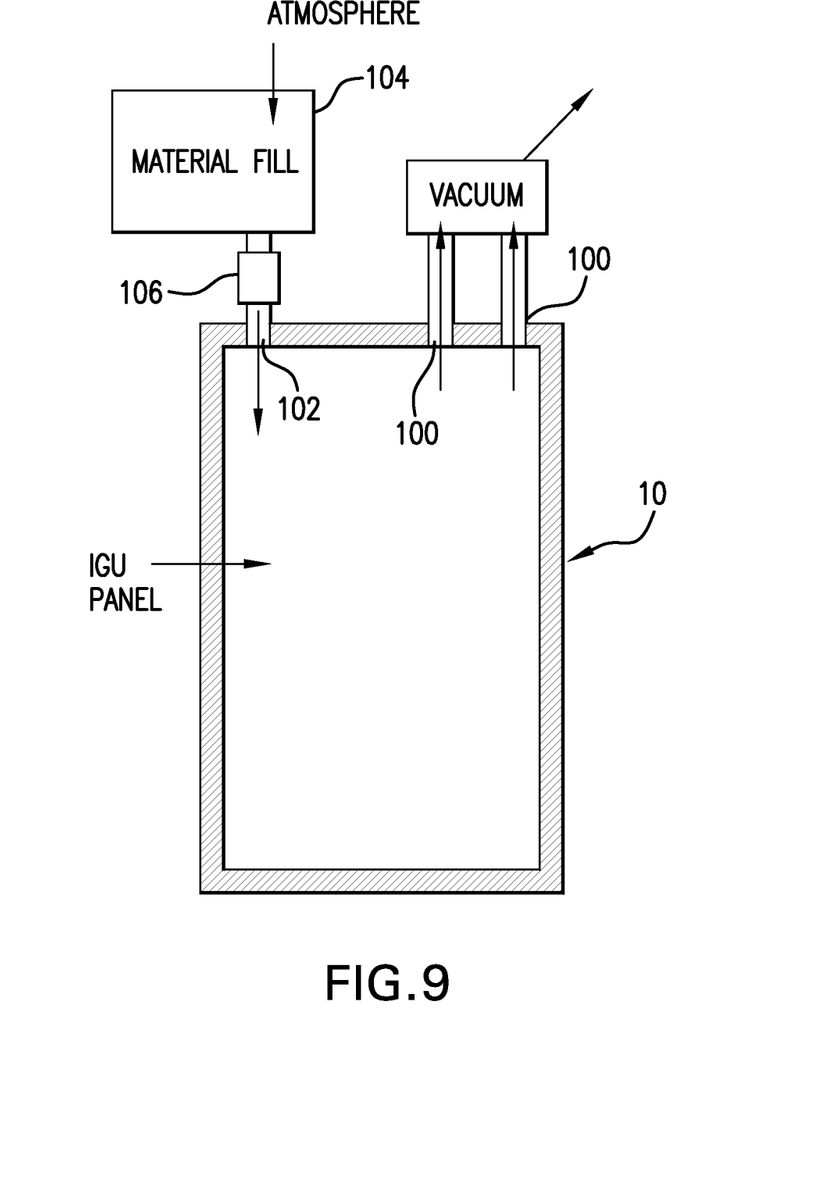
FIG. 9 is a schematic diagram depicting filling the cavity of a system through a filling tube while reducing the pressure in the cavity.

During gravitational filling, particulate material can be transferred from a container typically under atmospheric pressure, to the internal space of the system via a filling tube into the filling opening. Shown in FIG. 9 is system 10, e.g., a fully framed IGU, provided with opening 102, which preferably is resealable. Particulate material from container 104, typically under atmospheric pressure, is transferred into system 10 through filling tube 106. System 10 also can be connected to a vacuum pump, for example through orifices 100, described above. Other devices capable of reducing the pressure within the system can be employed.

To accommodate the dimensions of opening 102, e.g., within the range of from about 6 to about 25 mm, the flow of particulate material being transferred from container 104, through filling tube 106 can encounter a narrowing in cross sectional area and this narrowing can cause flow restrictions, flow blockage and/or densification of a particulate material such as aerogel, e.g., Nanogel®.

Figure 10:
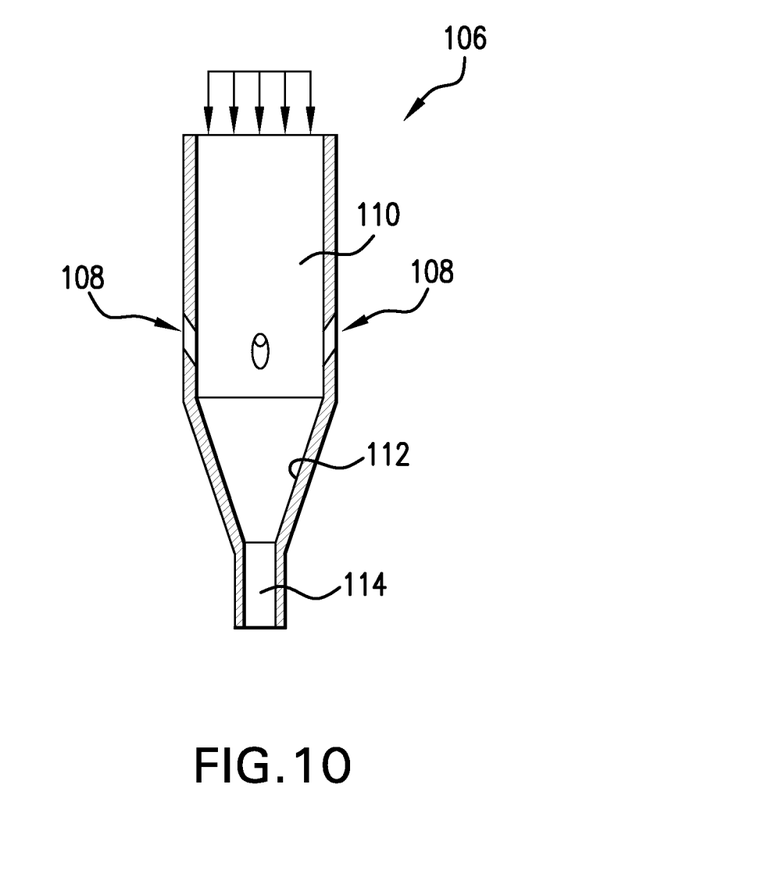
FIG. 10 is a longitudinal cross section of a vented filling tube.

To reduce or minimize densification, flow restrictions and/or blockage, filling tube 106 is vented trough one or more, e.g., 2-4, openings. Shown in FIG. 10 is filling tube 106 having air vents 108. The arrows indicate the flow of particulate material being directed to feeding tube 106. System 10 is connected to a vacuum pump through orifices 100, described above. The reduced pressure in the system results in a positive gas flow through air vents 108 into the cavity which prevents materials densification and blockages. Other devices capable of reducing the pressure within the system can be employed.

In one example, filling tube 106 has a total length in the range of from about 300 to about 500 mm; a cylindrical section 110 having a diameter in the range of from about 25 to about 100 mm and a length in the range of from about 200 to about 400 mm; and a tapered section 112, which can be about 100 mm long. Tip 114 of filling tube 106 can have a diameter in the range of from about 6 to about 25 mm.

Vents 108 preferably are located above tapered section 112. Other placements for air vents 108 also are possible.

Optionally, moisture can be removed from the material prior to, during or after the filling process. In one embodiment particulate aerogel material is dried prior to its introduction into the cavity, thereby reducing moisture content in the material and preventing condensation from forming within the insulated system. Suitable drying techniques that can be employed are described, for instance, in Final Report Glazings with Granular Aerogel, contract JOUE-CT90-0057, by J. J. Dengler and V. Wittwer, Fraunhofer-Institut fur Solare energiesysteme (ISE), Oltmannsstr. 5, D-79100 Freiburg, Germany, Dec. 15, 1993, the teachings of which are incorporated herein by reference in their entirety.

As discussed above, particulate materials have a tendency to settle, forming void regions that can diminish the overall insulating properties of the system. In translucent systems, they can cause uneven light transmittance, with void regions propagating more light than remaining regions filled with insulator.

To reduce or minimize settling and the formation of voids, the inner volume can be "overfilled" or "overpacked". Overpacked systems can have a density at least as high as the tap density. For aerogel particles, overfilling is to a density higher than the tap density. In systems filled with aerogel particles that are very light compared to the relatively heavy frame, the density can be considerably greater than the tap density, for instance about 105 to about 115%-120% and higher of tap density.

In a preferred embodiment of the invention, overfilling is accomplished by increasing the inner volume of the system. For instance, an externally applied force can be exerted on one or both walls pulling them away from one another. Shown in FIG. 2, for example, are walls 12a and 12b, held in a frame such as optional frame 14. Forces schematically indicated by arrows A and B, are exerted on the outer surfaces of walls 12a and 12b resulting in a configuration (represented by solid lines) in which the walls are outwardly bowed with respect to an initial configuration (represented by the dotted lines), in which the two walls are essentially parallel to one another.

Figure 2:
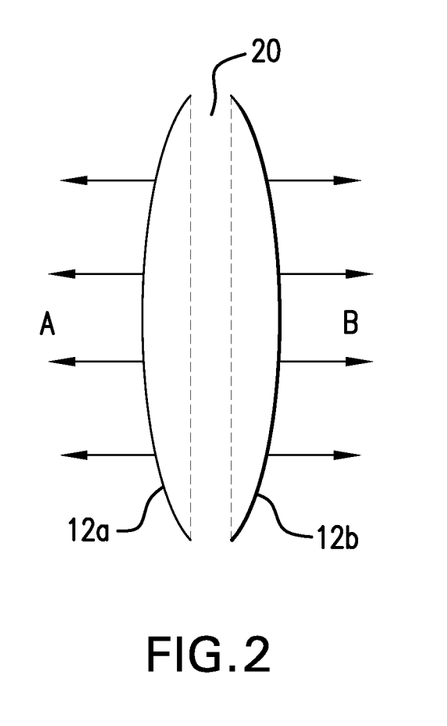
FIG. 2 is a schematic representation of increasing the internal volume of an insulated system.

Forces represented by arrows A and B can be of the same type, magnitude or can differ in type and/or magnitude. Furthermore, a force can be applied on one wall with no force exerted on the other.

Figure 4:
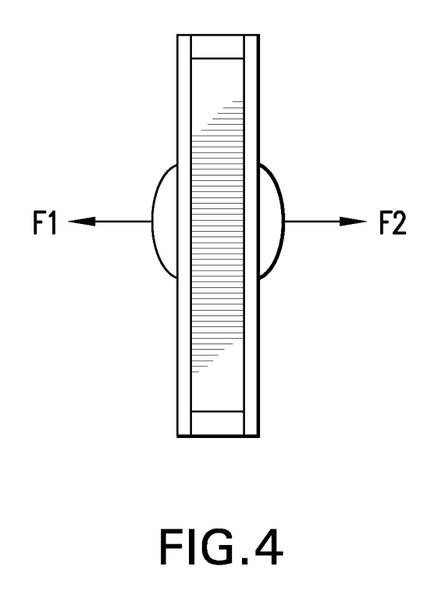
FIG. 4 is a schematic diagram of one embodiment in which point application of force is applied to increase the internal volume of the insulated system.

Suction cups optionally connected to pumping means as well as other point application of forces F1 and F2 also can be employed, as shown in FIG. 4. Placing more than one suction cup at different positions of each outer wall surface can improve force distribution over the entire wall.

Any suitable force can be employed. For example, glass panes can be pulled apart by dead weight loading, as described, in Final Report Glazings with Granular Aerogel, contract JOUE-CT90-0057 by J. J. Dengler and V. Wittwer, Fraunhofer-Institut fur Solare energiesysteme (ISE), Oltmannsstr. 5, D-79100 Freiburg, Germany, Dec. 15, 1993, the teachings of which are incorporated herein by reference.

In a preferred aspect of the invention, gap 20 is maintained at a pressure higher than the pressure outside system 10. If walls 12a and 12b are held in a frame such as optional frame 14, each wall is bowed outwardly, as illustrated in FIG. 2. In FIG. 2, the initial position of walls 12a and 12b is indicated by dotted lines and the bowed out position by a solid lines.

For instance, gap 20 can be maintained at atmospheric pressure while a negative pressure, e.g., a vacuum, schematically indicated in FIG. 2 by arrows A and B, can be exerted on the outer surfaces of walls 12a and 12b. Whereas mechanical loads typically are applied at localized regions of walls 12a and 12b, the pulling forces caused by negative pressure can be spread out over the entire wall area, reducing stresses and the likelihood of fractures in breakable walls such as glass panes.

Reducing the pressure outside walls 12a and 12b can be accomplished by means known in the art.

Figure 3:
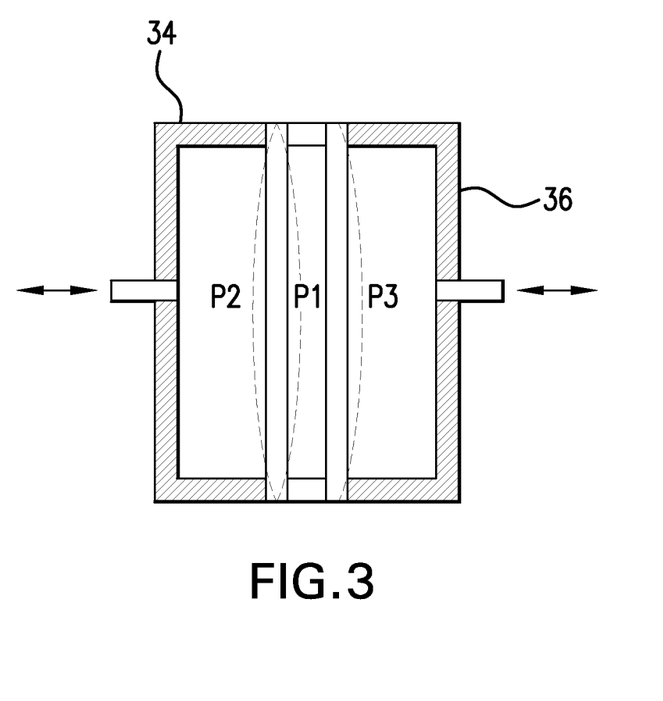
FIG. 3 is a schematic diagram showing vacuum box use to vary the surface force applied on the system walls.

For instance, the outer wall faces 30 and 32 can be enclosed by vacuum chambers or boxes 34 and 36, as shown in FIG. 3. Vacuum boxes 34 and 36 can be connected to pumps, compressors and so forth. Specific examples of suitable low pressure chambers are those used for testing and certification of multi-layered insulated glass, e.g., with respect to thickness change of a unit as a function of pressure reduction, as described, for example, in point 2.5.2 of Gütegemeinschaft Mehrscheiben-Isolierglas e.V., Rundschreiben Güte-Und Prüfbestimmungen, November 2002. Pressure in such chambers can be reduced, for example, to 100+/−5 hPa below ambient pressure.

The internal volume also can be increased by maintaining gap 20 at a pressure that is higher than the pressure exerted on the outer surfaces of walls 12a and 12b. For instance, a positive pressure differential can be applied at the inner faces of adjacent walls 12a and 12b, while the exterior of the system is maintained at ambient pressure.

In other examples, gap 20 is maintained at a pressure higher than ambient, for instance by applying positive differential pressure at the inner faces of adjacent walls 12a and 12b, while the exterior of the system is maintained at ambient pressure.

Negative or positive pressure also can be applied on a single wall.

Forces applied during filling or and/or employed to expand the internal volume can be applied continuously, intermittently or in a fluctuating manner. For example, mechanical force or a positive pressure differential can fluctuate or can be pulsed while a particulate insulator is introduced into the cavity. The fluctuating force can be applied on either the inside or the outside of one or both of walls 12a and 12b.

In one example a force of about +/−100N is applied in bursts or pulses at a frequency, e.g., of 1 to 10 times a second. Other frequencies and force ranges can be selected. Furthermore, an alternating force can be applied at a frequency that is constant throughout the filling process or at variable frequencies.

Figure 5:
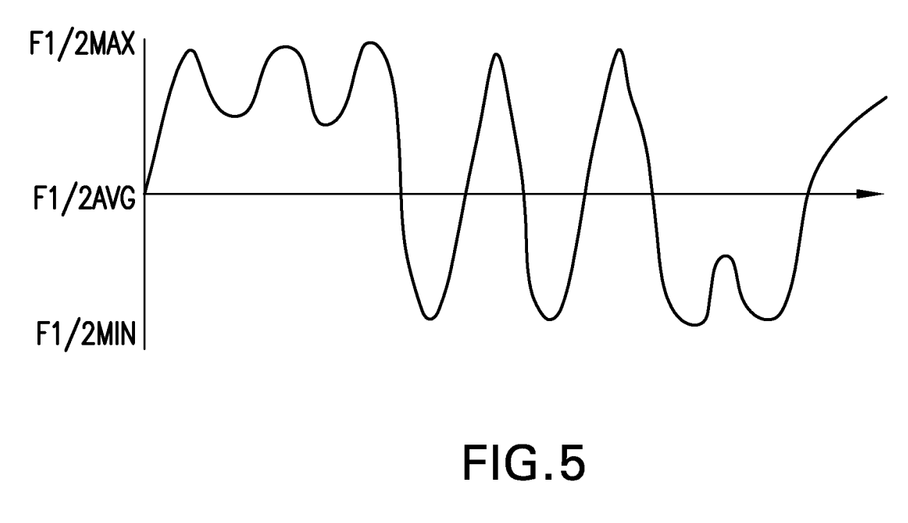
FIG. 5 is a plot showing a varying force, e.g., pressure P2, on the external surface of one of the panes in an insulated system.

As an example, FIG. 5 is a plot representation of varying force, between maximum and minimum values.

The extent of volume expansion can be determined by taking into consideration factors such as unit size, type of wall material employed, degree of overpacking desired, tolerances towards breakage and others. The volume increase can be, for instance, 200% or higher. In a theoretical estimate, a 6×3 m$^2$ tempered glass of 6 mm can be bend in the range of 20 cm before it breaks, resulting in a volume increase of around 800%. To ensure integrity of a typical seal, a more modest volume increase may be employed. For instance, a 3×3 m$^2$ glass unit of 6 mm tempered glass bulged 50 mm on each side, corresponding to a volume increase of around 200%. To obtain a finished system in which the walls are parallel rather than outwardly bulging, overpacking can be, for example, about 150% or less.

Optionally, to avoid excessive stress, mechanical restraints, e.g., external stops, can be employed to limit the expansion of the internal volume.

The increased volume created by pulling walls 12a and 12b apart can accommodate additional particulate material with respect to the original volume, resulting in overfilling of the volume when forces or pressures are eliminated and thus reduces or minimizes settling problems.

However, the layered structure having a bowed out arrangement such as illustrated in FIG. 2 can be unstable, for example with respect to stresses encountered during transport, installation, wind or weather exposure and so forth. In translucent systems, light propagating through uneven insulator thicknesses and bowed out walls can give rise to undesirable optical effects.

Stabilizing the system refers to producing a layered structure wherein the internal volume is substantially fixed.

The expanded volume described above can be decreased, for example, by withdrawing at least some of the gas, e.g., air, present in the interior volume. The pressure within gap 20 can be reduced, for instance, by connecting gap 20 to a vacuum pump. Reducing the pressure in gap 20 can be carried out in conjunction with increasing the pressure outside walls 12a and 12b, for example to atmospheric pressure. The pressure outside walls 12a and 12b can be returned to ambient before, during or after stabilization of the layered structure.

Figure 6:
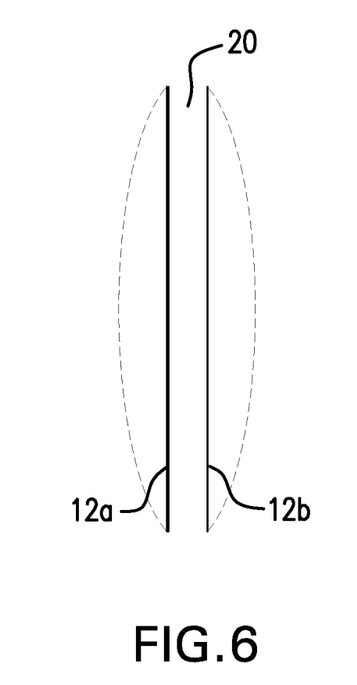
FIG. 6 is a schematic representation of stabilizing the insulated system shown in FIG. 2.

As shown in FIG. 6, with the pressure within gap 20 being reduced, the bowed out shape, shown by the dotted line, is lost and walls 12a and 12b become parallel or essentially parallel to one another.

Stabilization of systems that employ monolithic insulators can be conducted in a similar manner, for example by reducing the pressure within gap 20. Decreasing the pressure within gap 20 can be conducted without first increasing the internal volume of the system, e.g., by pulling walls 12a and 12b apart, as described above.

As used herein, the term "stabilized system" or "stabilized unit" refers to a system or unit having a substantially fixed internal volume. In specific implementations, a stabilized system or unit filled with aerogel material has been subjected to a negative pressure, e.g., a vacuum, or an external force, e.g., point load. In preferred examples, such a system or unit does not include an internal reinforcement, i.e., is internally un-reinforced.

Without wishing to be held to a particular mechanism or explanation, it is believed that exerting a vacuum in an un-reinforced system containing a monolithic insulator causes the monolith itself to act as an internal reinforcement, thereby increasing the overall stability of the system.

Stabilized systems can be finished, for example, by completing the frame, closing or sealing orifices or other opening and/or by other steps commonly taken during the manufacture of insulated systems.

The method described above can also be used to produce vented systems. In a vented system the internal and external volumes are at the same pressure and the pressure in the internal cavity follows any fluctuations in the external pressure. Product stabilization in this system is achieved by a combination of vibrational packing of the particulate material and the elastic springback of the two outer panes.

Stabilization of the system also can be conducted without completely sealing the system. In these cases pressure communication between the cavity and the environment can be dynamically modulated, for example by providing a vented opening such as a small hole or tube, e.g., a capillary tube, or a valve, preferably a one directional (one-way) valve. The system can include more than one opening. Any suitable location can be selected for the opening. In framed systems, e.g., window units, a vented opening can be located, for instance, at an edge of the frame. Alternatively or in addition to, a vented opening also can be provided in the face of one of the walls. In window units, for example, a vented opening can be situated directly in the face of a glass pane.

In one embodiment, a small tube is installed in an opening in a system overpacked with material after vibration and forced compression. As the internal cavity heats up during daily solar exposure, the pressure rise inside the cavity but the tube allows pressure equalization between the cavity and the ambient environment. In this gradual or slow pressure process the hole (or tube) allows for the internal pressure to be equalized, thereby preventing expansion of the cavity and further settling.

With rapid pressure fluctuations, e.g., an external positive or negative wind pressure, the air flow through the hole is restricted and the unit acts essentially as a sealed system, with the two panes moving together.

In another embodiment, the system is provided with a one way valve—that is a valve that allows air to flow out of the insulated glass unit, but not into it. As the air in the internal cavity of a traditionally sealed insulated glass unit heats up during daily solar exposure, the air inside the window heats up differentially faster than the air outside the window, thus expanding the volume inside the sealed window. Expansion of the internal volume of a sealed unit can also be caused by outside air pressure reduction, such as occurring during a meteorological depression, transport via high altitudes and/or delivery of the unit to a construction site located at a higher altitude than the manufacturing (and sealing) site. By employing a one-way valve, the pressure is able to equalize, with no volume change in the cavity or gap due to air leaving the panel through the valve.

As the cavity cools at night, the pressure drops and the relatively higher pressure outside the cavity would normally have the tendency to shrink or collapse the cavity. However such shrinkage is prevented by the compressible and springy aerogel material which acts as a brace or reinforcement, providing support. If there are sudden pressure changes on the outside, e.g., wind loads, the one way valve acts as a seal and the cavity is pressure locked.

Insulated systems fabricated as described herein can have one or more properties further discussed below.

Preferably, the insulated systems have a measure of thermal resistance to heat flow, referred to herein as "R" value of at least 2, preferably within the range of from about 3 to 38. A desirable R value for the composite is greater than the R value of the outer layers in the absence of the insulation materials.

The insulated systems can provide acoustic insulation. This can be expressed in terms of sound transmission class or STC which is often used to assess acoustic insulation of floors, ceilings and other building units. Generally, higher STC values reflect better acoustic insulators. Insulated systems described herein can have STC values in the range of from about 22 to about 44 or more.

In preferred embodiments, glass and other window units fabricated as described above have a visible light transmission greater than 0%, preferably greater than 0.5% and most preferably up to 80% or higher. Also preferred are units that have high ultraviolet (UV) reflectance, for instance a UV reflectance of at least 80%. Solar heat gain coefficients can be close to 0.0 and are often in the range of from about 0.21 to 0.73.

Insulated window units produced as described above can be tested by the following industry standards: ASTM-E744, ASTM E-2189 and other suitable methods.

Preferably, units produced as described herein can have a mechanical stability to equivalent wind load resistance of 500 Pa.

Examples of insulated glass units include 1200 mm×1200 mm units filled with aerogel to about 120% of tap density and subsequently stabilized at a reduced pressure of 80 kPa (abs).

An internally unreinforced insulated system comprising an aerogel material between polycarbonate adjacent walls can have a surface area greater than about 0.1 m².

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for fabricating an insulated system, the method comprising:
   a. introducing an insulator that is in particulate form in an internal volume between adjacent walls, to form a layered structure, wherein the insulator includes translucent aerogel and the adjacent walls are panes made of glass or plastics; and
   b. stabilizing the layered structure by decreasing the internal volume of the layered structure, to produce the insulated system.

2. The method of claim 1, wherein the internal volume is expanded prior to step b. and the layered structure is stabilized by decreasing the expanded internal volume.

3. The method of claim 2, wherein the internal volume is expanded by applying a force on outer faces of the adjacent walls.

4. The method of claim 3, wherein the force is applied continuously, intermittently or is fluctuated.

5. The method of claim 2, wherein the internal volume is expanded by maintaining the internal volume at a pressure higher than a pressure on outer faces of the adjacent walls.

6. The method of claim 2, wherein the internal volume is expanded by maintaining the external ambient pressure at a pressure lower than the internal cavity.

7. The method of claim 2, wherein the adjacent walls have an inner face and an outer face and the internal volume is expanded by applying a fluctuating negative or positive pressure at either the inner face or the outer face.

8. The method of claim 2, wherein expanding the internal volume is limited by mechanical restraints.

9. The method of claim 2, wherein at least one outer face of the adjacent walls is enclosed by a vacuum box.

10. The method of claim 1, wherein the insulator is a porous, microporous or nanoporous material.

11. The method of claim 1, wherein the insulator includes aerogel, optionally combined with a non-aerogel material selected from the group consisting of alumina, silica, aluminosilicate, expanded perlite, expanded polystyrene, polypropylene beads, glass micropsheres and any combination thereof.

12. The method of claim 1, wherein the insulator is an aerogel.

13. The method of claim 1, wherein the internal volume is overpacked with particulate material.

14. The method of claim 2, wherein the adjacent walls are made of glass, polymer, stone, ceramic or metal.

15. The method of claim 1, wherein the layered structure is stabilized by removing at least a portion of ambient gas from the internal volume, by elastic springback of the adjacent walls or by applying a negative pressure to the internal volume.

16. The method of claim 1, wherein the layered structure is stabilized by subjecting the insulator in the internal volume to a compressive force, wherein an external mechanical load is applied to the walls and the cavity is sealed from pressure communications with the environment at the highest level of compression.

17. The method of claim 2, further comprising sealing the system.

18. The method of claim 1, wherein the insulated system is vented for pressure communication between the internal volume and ambient environment.

19. The method of claim 18, wherein venting is through at least one opening selected from the group consisting of a capillary tube and a one-way directional valve.

20. The method of claim 18, wherein the insulated system acts as a sealed system when exposed to a rapid pressure fluctuation in the ambient environment.

21. The method of claim 18, wherein pressure built-up within the insulated system is released, thereby preventing internal volume from expanding.

22. The method of claim 18, wherein the insulator counteracts shrinkage of the internal volume when said volume is subjected to a gradual pressure drop.

23. An insulated system produced by the method of claim 2.

24. The method of claim 1, wherein the insulator contains hydrophobic aerogel.

25. The method of claim 1, wherein the insulated system is a window unit having a light transmittance (% T) of at least 0.5% when measured at visible light wavelengths.

* * * * *